United States Patent
Barwick, III et al.

[15] 3,650,663
[45] Mar. 21, 1972

[54] METHOD FOR TREATING SYNTHETIC LINEAR POLYESTERS FIBERS AND FILM IN THE VAPOR PHASE TO IMPROVE THE DYEABILITY AND TO HEAT SET SAID POLYESTERS

[72] Inventors: Frederick E. Barwick, III, Charlotte; Vernon C. Smith, Huntersville, both of N.C.; Robert W. McCullough, Riverside, Conn.; James B. Hobgood, Roxboro, N.C.

[73] Assignee: Collins & Aikman Corporation, New York, N.Y.

[22] Filed: Sept. 15, 1969

[21] Appl. No.: 857,844

[52] U.S. Cl. ............................................8/4, 8/179, 8/165, 8/94
[51] Int. Cl. .......................................................D06p 3/00
[58] Field of Search.....................8/4, 179, 165, 175, 174, 94

[56] References Cited

UNITED STATES PATENTS

| | | | |
|---|---|---|---|
| 2,999,002 | 9/1961 | Dayvault | 8/166 |
| 3,512,913 | 5/1970 | Day et al | 8/4 |

Primary Examiner—Donald Levy
Assistant Examiner—B. Bettis
Attorney—Paul & Paul

[57] ABSTRACT

A method is provided for improving the dyeability and for heat setting synthetic linear polyesters, wherein the polyester in fibrous or film form is contacted with a vapor of a monocyclic or bicyclic halogenated aromatic hydrocarbon for $10^{-4}$ to 20 seconds. The halogenated aromatic hydrocarbon is removed from the polyester after treatment. The polyester fibers and films treated in accordance with the method of this invention exhibits superior dyeing properties being readily dyed to deep shades in the absence of a carrier. The polyester fibers and films treated in accordance with the present invention likewise exhibit improved dimensional stability.

9 Claims, 2 Drawing Figures

Patented March 21, 1972

3,650,663

INVENTORS
FREDERICK E. BARWICK
VERNON C. SMITH
ROBERT W. McCULLOUGH
BY  JAMES B. HOBGOOD

*Paul + Paul*
ATTORNEYS.

METHOD FOR TREATING SYNTHETIC LINEAR POLYESTERS FIBERS AND FILM IN THE VAPOR PHASE TO IMPROVE THE DYEABILITY AND TO HEAT SET SAID POLYESTERS

BACKGROUND OF THE INVENTION

1. Field of the Invention

This invention is concerned with a method for modifying the properties of synthetic linear polyesters. More particularly this invention is concerned with a method for improving the dye ability and dimensional stability of polyester fibers and films.

2. Description of the Prior Art

The synthetic linear polyesters which are prepared from dibasic aromatic acids and glycols such as the polyesters of the polyethylene terephthalate type possess many properties which make them especially valuable for employment in the form of fibers and films. However, due to a combination of the relative chemical inertness of the polyester polymers and the hydrophobic nature of the polyester polymers and the high degree of compactness of the fibers and films made from the synthetic linear polyester, considerable difficulty is encountered in dyeing polyester fibers and films.

Various suggestions have been made to improve the dyeability of the polyesters. One such suggestion was to dye the polyesters with dyestuffs having a relatively small molecular size. The resultant polyester dyeings, however, had poor fastness especially to laundering. An additional suggestion was to employ high temperature high pressure dyeing techniques. This suggestion was not satisfactory in that it required the use of special pressure dyeing apparatus, and necessitated the use of batch dyeing techniques.

An additional suggestion was to include in the aqueous dye bath compounds referred to as carriers to assist the application of the dyestuffs onto the polyester fibers and films. Various types of compounds were suggested as carriers. These compounds included, for example, phenolic compounds, such as, o- or p- phenylphenol, esters such as methylsalicylate and halogenated compounds such as the dichlorobenzenes and the trichlorobenzenes. The amount of the carriers that were added were dependent to some extent on the depth of the shade desired. However, the amount of the carrier that was generally employed was in the range of approximately 10 percent by weight of the dye bath. The carrier dyeing technique was not satisfactory. Initially the use of the carriers substantially increased the cost of dyeing the polyesters. The rate of dyeing was substantially improved. However, the rate of dyeing was still relatively slow requiring approximately 60 minutes of dyeing time for exhaustion of the dye bath under normal dyeing conditions. This length of dyeing time precluded the use of continuous dyeing methods when dyeing polyesters using the carrier dyeing technique.

Attempts have been made to improve the dyeability of the polyesters by pre-treating the polyesters before dyeing. It was reported, for example, by A. H. Brown, and A. T. Peters in American Dyestuff Reporter of Apr. 22, 1968, that when polyester fibers were pre-treated with aqueous dispersions of carriers that the resulting pre-treated fibers had better dyeability in the absence of the carrier than the untreated fibers. However, it was further reported that the pre-treated fibers did not exhibit the same dyeability as untreated fiber dyed in the presence of a carrier. Accordingly, the pretreatment with the aqueous dispersions of the carriers was not a satisfactory solution.

Various methods were suggested, in the prior art, wherein the surfaces of synthetic linear polyester fibers were made more dyeable. One such method was disclosed by D. S. Adams, U.S. Pat. No. 3,155,754, wherein the surfaces of polyester fibers were treated with semi-solvents for the polyester to form a layer of more dyeable polyester material on the outer surface of the fibers. The resulting fibers had a sheath-core structure. The outer sheath of the fibers accepted the dyestuff more readily than the untreated fibers. The resultant dyeings were not, however, satisfactory in that the fibers were "ring dyed" because of the difference in the dyeability of the sheath and the core. Fibers that are "ring dyed" are unsatisfactory in that as the fiber wears or is abraded the color changes noticeably.

Another method of treating the surfaces of polyester fibers to improve their dyeability is disclosed by Gruschke, et al., U.S. Pat. No. 3,154,374. In the Gruschke, et al. process polyester fibers are treated at high temperatures, for example 200° to 350° C. for short periods of time, for example $10^{-4}$ seconds to 10 seconds, with certain selected esters, ethers or ketones. Typical treating agents employed in the Gruschke, et al. process are for example, sebacic acid dimethylester, benzophenone and phenylbenzoate. The process taught by Gruschke, et al. was not a satisfactory solution to the problems of dyeing polyesters. At the temperatures at which the Gruschke, et al. process was conducted the polyesters shrunk considerably. The increase in the dyeability of polyester fibers was at best only a surface effect which caused the "ring dyeing" of the fibers which had the well known disadvantages noted above. In addition, the Gruschke, et al. process at best only increased the rate of dyeing the pre-treated polyesters to that obtainable with the use of a carrier which limited the dyeing of the polyesters to the batch type dyeing rather than continuous methods of dyeing.

Despite all of the various methods suggested in the prior art for improving the dyeability of the polyesters, it was still not possible to satisfactorily obtain printed polyester fabrics in relatively heavy shades, especially on heavy weight materials. The inability to satisfactorily print heavy weight polyester fabrics considerably limited the use of the polyester fibers in certain high volume fabrics, such as, printed carpeting.

An additional area wherein some difficulty was encountered with the polyester fibers was the manufacture of texturized yarn and fabrics. Texturized yarns and fabrics are employed in order to obtain special effects, such as, high bulk or to impart elastic properties to the fabrics. Various well known methods are employed to make texturized yarns, such as, twist-untwist, false twisting, knit deknit, and so forth. In the various processes the yarn or fabric are heat set at least once in order to set the texturized effect in the yarn or fabric. The heat setting step has caused considerable problems especially with regard to both the cost and the uniformity of the treatment. Depending on the process employed, the yarn may be subjected to several coneings and also to batch type autoclaving for extended periods of time which increase the process costs. The ends comprising a given fabric may receive substantially different treatment in heat setting. The difference in the treatment causes variations in both the dyeability and the appearance of the final fabric. The variations in the heat set treatment cause defects in the finished produce as barre marks and unlevelness in the dyeing of the fabrics.

It is an object of the present invention to overcome the forementioned problems and difficulty encountered in the prior art methods.

It is a further object of this invention to provide a process for improving the dyeability of synthetic linear polyester fibers and films.

It is a still further object of this invention to provide a method of pre-treating synthetic linear polyester fibers and films so that they can be dyed in the absence of a carrier in a time which is substantially less than that required for the dyeing of untreated polyester in the presence of a carrier.

It is an additional object of this invention to provide a method for dimensional stabilizing texturized yarns and fabrics comprised of synthetic linear polyester fibers in which the treatment is substantially uniform to all of the fibers comprising the fabric or yarn and is conducted in a short period of time in a continuous manner.

Other objects and advantages of the present invention will become further apparent from a review of the attached drawing and a reading of the specification and subjoined claims.

SUMMARY OF THE INVENTION

The objects of this invention have been achieved by providing a method wherein the synthetic linear polyester fibers or films are treated with a vapored halogenated aromatic for about $10^{-4}$ to 20 seconds and then the halogenated aromatic hydrocarbon is extracted from the polyester.

DESCRIPTION OF THE PREFERRED EMBODIMENT

Figure 1:
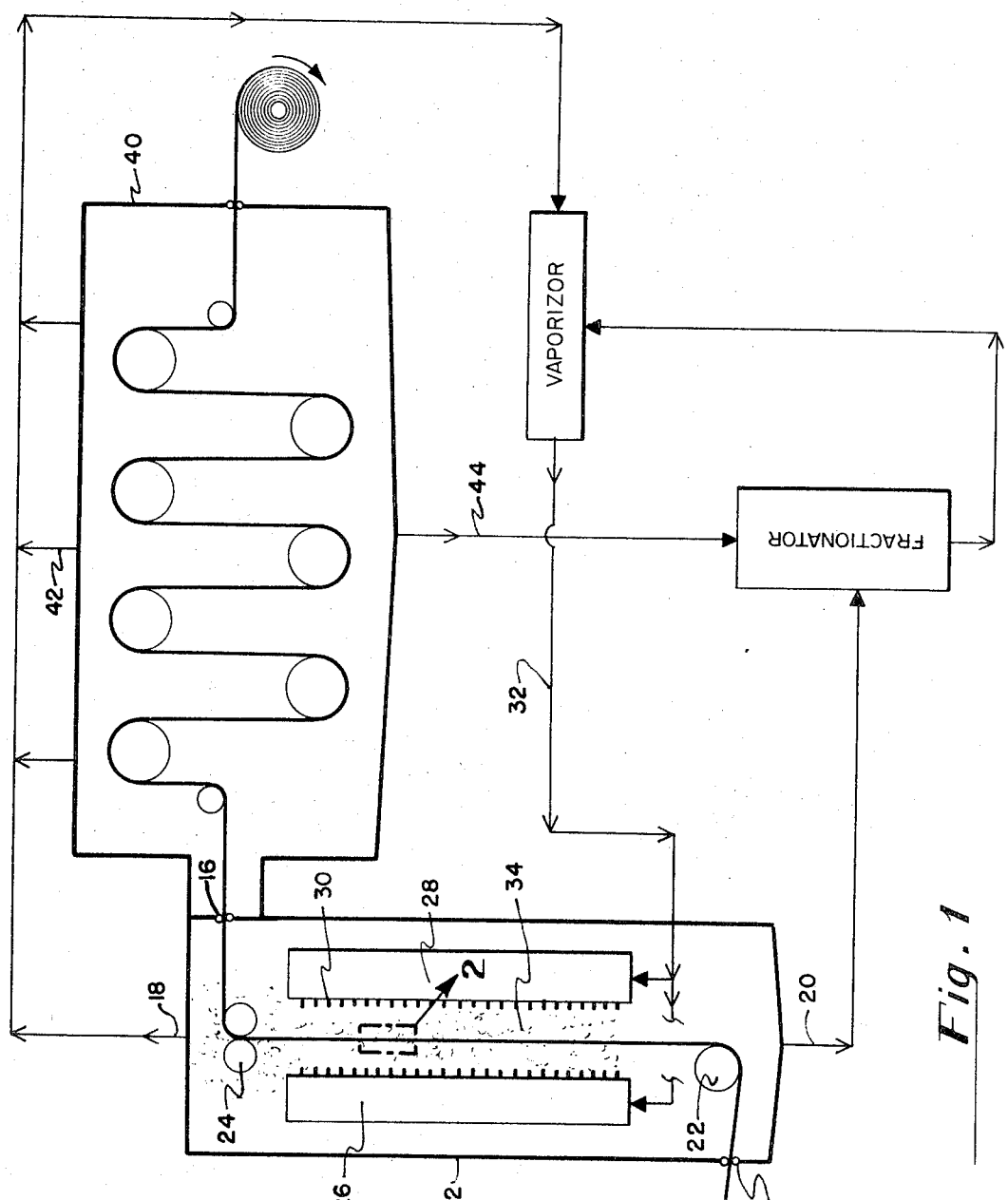
FIG. 1 is a schematic illustration of an apparatus for treating synthetic linear polyesters in the vapor phase.

The synthetic linear polyesters which are preferably treated in accordance with the present invention are the condensation polymerization products of dicarboxylic acids and polyhydric alcohols. The repeating structural units of the polymer chain include at least one divalent carbocylic ring containing at least six carbon atoms which is present as an integral part of the polymer chain and have a minimum of four carbon atoms between the points of attachment of the ring in the polymer chain. The preferred synthetic linear polyesters are of the polyethylene terephthalate type. Other types of polyesters are likewise employable such as those obtained by polymerizing a dicarboxylic acid such as terephthalic acid, bromoterephthalic acid, 4, 4'-benzophenonedicarboxylic acid and so forth with glycols such as those of the formula $HO-(CH_2)_n-OH$ wherein, $n$ is a whole number from 2 to 10, diethylene glycol, neopentylene glycol and the like.

The synthetic linear polyesters that are treated may be found in various physical shapes. The polyesters may, for example, be treated in the form of continuous films from about 0.5 to 20 mils thick. The polyesters may also be treated in the fibrous form. When referring to fibers and to the fibrous form this is intended to include, unless otherwise indicated, fibers per se such as continuous filaments and also to include fibers which have been manufactured into yarns and fabrics. With regard to the fabrics the terminology fabrics includes woven fabrics, knitted fabrics and nonwoven materials. When referring to yarns this is intended to include filament yarns, spun yarns, slit yarns and fibrillated yarns. The yarns and fabrics that are treated according to this invention preferably consist of only polyester fibers. However, it is possible to treat polyesters in blends with other fibers by the present invention providing the other fibers are not adversely affected.

The halogenated aromatic hydrocarbons which are employed in the present invention are monocyclic hydrocarbons. The halogenated aromatic hydrocarbons are represented by the formula

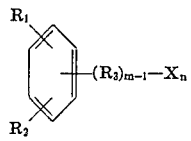

wherein $R_1$ and $R_2$ are the same or different and represent hydrogen, an alkyl having one to four carbon atoms such as methyl, ethyl, n-propyl, isopropyl, and n-butyl or an alkenyl having two to four carbon atoms such as vinyl, 1-propenyl and 2-butenyl. $R_3$ is a lower alkylene having one to four carbon atoms such as methylene, ethylene, propylene and butylene. The symbol X in the above formula stands for a halogen such as fluorine, chlorine, bromine or iodine, $n$ is a whole number from 1 to 3 and when $n$ is 2 or more X can stand for the same or different halogens.

The halogenated aromatic hydrocarbon employed in the method of the present invention should have a boiling point below the shrink or decomposition temperature of the polyester to be treated. The boiling point should be at least 10° C. and more preferably at least 20° C. lower than the shrink or decomposition temperature of the polyester to be treated. Since most polyesters start to exhibit shrinking at temperatures of about 230°–260° C., the upper limit on the boiling point should be 220°–250° C. depending on the particular polyester being treated.

It is, however, of considerable advantage to use lower boiling halogenated aromatic hydrocarbon solvent since this gives a wide range of control over the process condition that may be employed. The halogenated aromatic hydrocarbon should advantageously be substantially anhydrous. However, it can contain minor amounts of water and will tend to pick up small amounts of water from the polyester being treated. The water can be easily removed from the treating medium when it is purified since the halogenated aromatic hydrocarbons are water immiscible.

Blends of halogenated aromatic hydrocarbons can be employed if desired, however, it is preferable to employ a single compound as it facilitates the treatment step and the recovery of the halogenated aromatic hydrocarbon as will be more specifically set out below.

The preferred halogenated aromatic hydrocarbons for employment in this invention are represented by the formula

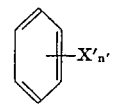

wherein X' is chlorine or bromine and $n'$ is 1 or 2. The monohalogenated benzane compounds are one of the preferred classes of compound because of their relatively low boiling points. Monochlorobenzene, because of its relatively low boiling point and its relatively low cost, is an excellent compound for use in this process. When higher boiling points are required, compounds such as bromobenzene and iodobenzene can be employed to some advantage.

The dihalogenated benzenes are also quite useful in the process of the present invention and are one of the preferred class of compounds. All of the isomers of the dihalogenated benzenes such as the dichloro, the dibromo and the diiodo benzenes give excellent results. The mixed dihalogenated compounds, such as m- and p- bromochlorobenzenes and the iodobromodenzene compounds, such as the ortho and meta isomers are likewise useful in the present invention.

The trihalogenated benzenes, such as the 1, 2, 3- trichloro, 1, 2, 4- trichloro and the 1, 3, 5- trichloro benzenes can be employed but, because of their relatively high boiling points and because of the presence of the additional halogens, are more difficult to control in this process of the present invention.

Of the compounds wherein $R_1$ or $R_2$ represent alkyls having one to four carbon atoms, by far the most important class of compounds are the halogenated toluenes and halogenated xylenes compounds, especially the monohalogenated compounds, such as the chlorotoluenes and bromoxylenes.

Of the compounds where $R_3$ is a lower alkylene and $m$ is 2 particular attention is directed to compounds such as α chlorotoluene, α- o - dichlorotoluene, αbromotoluene and αbromo- o - xylene.

The selection of the particular halogenated aromatic hydrocarbon is dependent on various factors such as the desired treatment temperature, cost and commercial availability of the compound, and the resulting improvement in the properties of the polyester. By comparing all of these factors it has been found that either mono or dichlorobenzenes are clearly the preferred compounds for employment in the present invention.

In the method of this invention the polyester material is contacted with a vapor of a halogenated aromatic hydrocarbon of the type described above. The polyester material is held in contact with the vapor for a relatively short period of time. Times as short as $10^{-4}$ seconds can be used and still obtain satisfactory results. Shorter times can also be used and some improvement of the properties will be obtained, but the improvement will be somewhat marginal. Treatment times up to 20 seconds can be employed. Treatment times in excess of 20 seconds are generally not required in that the improvement in properties obtained by exposing the polyester for more than 20 seconds is not significant.

The optimum time of exposure to the vaporized halogenated aromatic hydrocarbon is dependent on a number of inter-related factors. The weight per square yard and the structure of the polyester must be considered. Film of an equivalent weight per square yard as a fabric generally require a longer treating time in order to obtain an equivalent treatment because of the higher density of the film as compared with the fabrics. Heavy weight goods require longer treatment times than light weight goods. A critical factor with regard to the treatment time is the treatment temperature at which the process is conducted. The higher the treatment temperature the shorter the treatment times that are required. A still further factor to consider is the particular halogenated aromatic hydrocarbon that is employed. The lower halogens, for example, chlorine are more active and the activity increases with an increase in the number of halogens substituent on the compounds that are employed.

In order to further explain the method of this invention specific reference is made to the drawings. In FIG. 1 an apparatus is schematically illustrated which is especially well suited for employment in the process of the present invention. A continuous length of a polyester material is fed into a vapor treating chamber 12. The continuous length of material 10 could be in the form of a film, fabric, yarn or the like. The vapor treating chamber 12 is a closed chamber having upper and lower seals 14, 16 through which the polyester material enters and leaves the chamber 12. At the upper portion of the chamber is an exhaust line 18 for taking off vapors. At the base of the chamber 12 there is a drain line 20 for removing liquids. Inside the chamber there is a lower guide roll 22 and a pair of upper rollers 24 which both guide and nip the polyester material 10 as it passes through the chamber 12. Positioned within the chamber 12 is a pair of parallel distributing heads 26, 28, each of which has a plurality of orfices 30. The orfices 30 on each distributing head 26, 28 are directed at the portion of the polyester material 10 passing between the distributing heads 26, 28. The halogenated aromatic hydrocarbon is heated above its boiling point to the desired treatment temperature in the vaporizer. The vapors are fed through the feed line 32 into each of the distributing heads 26, 28. The vapors 34 are discharged from the heads 26, 28 through the orfices 30 in each of the heads. The polyester material 10 is fed through the vapors 34 at a speed such that the length of exposure to the vapors 34 is in the order of $10^{-4}$ to 20 seconds.

Figure 2:
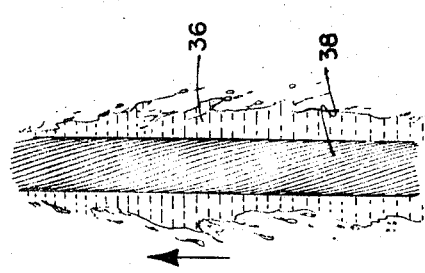
FIG. 2 is a pictorial illustration of a polyester yarn taken as indicated by the dotted area 2 on FIG. 1.

In the preferred method of this invention the temperature of the polyester material 10 as it enters the chamber 12 and the temperature of the vapors 34 are maintained so that the vapors 32 will condense on the surface of the material being treated. As shown in FIG. 2 the halogenated aromatic hydrocarbon should preferably condense in a thin film 36 on the surface of the polyester yarn 38. As the polyester material 10 is fed through the vapors 34, it will be heated by the vapors 34. In the optimum operating conditions the polyester material 10 will gradually be heated by the vapors 34 to a temperature above the boiling point of the halogenated aromatic hydrocarbon, whereupon the film of liquid 36 is volatilized off the treated polyester material 10.

The process of the present invention can also be conducted so that there is no condensation at all on the polyester 10 during treatment, that is, it can be conducted completely in the vapor phase.

After treatment in the chamber 12 the halogenated aromatic hydrocarbon is removed from the polyester material 10. One of the better ways of removing the treating media is to pass the polyester through a vacuum dryer 40. The vacuum dryer removes the residual treating agent from the polyester material 10. The vapors are exhausted from the vacuum dryer 40 and returned by the line 42 to the vaporizer where the vapors are reheated and recirculated to the distributing heads 26, 28. Any liquids condensing in the vacuum chamber are drained through the line 44 to a fractionator and the halogenated aromatic hydrocarbon is recovered and returned to the vaporizer.

The halogenated aromatic hydrocarbon can also be solvent extracted from the polyester. The extraction is advantageously conducted by passing the treated polyester through a solvent with which the halogenated aromatic hydrocarbon is miscible and which has a boiling point which is substantially different and preferably lower than the boiling point of the halogenated aromatic hydrocarbon in order to facilitate the separation and recovery of the materials. Solvents which have proven to be especially valuable as extraction media are the halogenated aliphatic hydrocarbons, such as methylene chloride, trichloroethylene, 1, 1, 1- trichloroethane, perchloroethylene and mixtures thereof.

The synthetic linear polyesters treated in accordance with the present invention are equivalent to the untreated polyesters with regard to their physical properties, such as tensile strength. There is no substantial gain or loss in weight due to the treatment of the present invention. However, the polyesters treated in accordance with this invention can readily be dyed in the absence of a carrier at normal pressures. The most suitable dyestuffs for dyeing the polyesters treated in accordance with this invention are the dispersed dyestuffs which include dyestuffs in the azo, azomethine, nitroarene and anthraquinone chemical classes. Surprisingly, the dyeing, even though conducted in the absence of a carrier and at normal pressures, can be conducted in a considerably shorter time with a 75 percent reduction in dyeing time being easily obtained. It should be further noted that the dyeing is not surface dyeing but rather the fiber is dyed to its entire volume and the dyeing is level. The exhaustion of the dyestuffs from the dye bath is almost 100 percent. The treated polyester can be dyed continuously because of the possibility of employing relatively short dyeing times using, for example, pad steam continuous type dyeing machines. It is also possible to print the polyesters, even the heavyweight polyesters such as carpeting, and obtain sharp accurate prints in relatively deep shades which exhibit excellent fastness.

The polyester fibers and films which are heat set according to the method of this invention have a uniform set which is resistant even to treatment in boiling water. The heat setting of the polyester is relatively simple to control so as to obtain reproducible results on each run. In addition, all the ends of a given warp can be treated at the same time so as to have uniform treatment across the width of the fabric. The heat setting is completed in a matter of a few minutes rather than hours as required with the conventional heat setting methods and with a minimum amount of labor being involved.

In order to illustrate the present invention, below are examples showing typical methods of employing the present invention. Percentages referred to in the examples are to be considered the percentages by weight not volume unless otherwise indicated.

EXAMPLE 1

A 4-ounce 80-square fabric made of spun polyethylene terephthalate fiber, commercially known as Dacron, was placed in a chamber saturated with vapors of chlorobenzene at 132° C. for a period of 10 seconds. The fabric was then immersed in three separate portions of 1, 1, 1- trichloroethane in order to remove the chlorobenzene and subsequently dried at 90° C. for 30 seconds in order to remove the residual 1, 1, 1- trichloroethane.

The treated fabric was dyed at 99°–100° C. for 1 hour in a 30:1 liquor ratio dyebath of the following composition:

1.0 percent OWF Disperse Blue 27
0.5 percent OWF Sodium acetate

After dyeing the fabric was washed with water at 30° C. in order to remove any unfixed dyestuff. The fabric was dyed a full shade of blue.

A sample of fabric as described above which was not treated with vapors of chlorobenzene was dyed at 99°–100° C. for 1 hour in a 30:1 liquor ratio dyebath of the composition described above. After dyeing the fabric was washed with water at 30° C. in order to remove any unfixed dyestuff. The fabric was stained a pale shade of blue.

Another sample of fabric as described above which was not treated with vapors of the chlorobenzene was dyed according to the previously describe procedure with a dyebath of the following composition:
1.0 percent OWF Disperse Blue 27
0.5 percent OWF Sodium acetate
10.0 percent OWF Emulsified Biphenyl carrier After dyeing the fabric was washed with water at 30° C. in order to remove any unfixed dyestuff. A full shade of blue almost equal in depth and shade to the sample which was treated with chlorobenzene vapors was obtained.

EXAMPLE 2

The procedure described in Example 1 was repeated with the sample being treated with vapors of various other halogenated aromatic hydrocarbons as noted below:

| Sample | Halogenated Aromatic Hydrocarbon | Color |
|---|---|---|
| 1 | Bromobenzene | Deep level blue |
| 2 | α, α, 2-trichlorotoluene | As above |
| 3 | α, α, -dichloro-p-xylene | As above |
| 4 | 1, 2-dichlorobenzene | Deep blue. Some shrinkage |

EXAMPLE 3

The general procedure disclosed in Example 1 was repeated but different commercially available polyethylene terephthalate fibers and different dyestuffs were employed.

| Polyester Fiber | Disperse Dyestuff | Color |
|---|---|---|
| Vycron | CI Red 60 | Bright level red |
| Vycron | CI Blue 27 | Full blue |
| Encron | CI Yellow 54 | Bright yellow |
| Encron | CI Blue 56 | Bright blue |
| Kodel | CI Yellow 42 | Full yellow |
| Kodel | CI Red 65 | Deep level red |
| Fortrel | CI Blue 64 | Deep level blue |
| Fortrel | CI Yellow 23 | Deep level yellow |

EXAMPLE 4

Knit stocking samples made of 150 denier polyethylene terephthalate fiber, commercially known as Fortrel, were treated with chlorobenzene vapors at 132° C. for 10 seconds and the chlorobenzene was removed in a series of three extractions with 1, 1, 1- trichloroethane and the samples were dried at 90° C. for 30 seconds to remove the residual 1, 1, 1-trichloroethane. The treated samples, a blank, and a sample which was only subjected to extraction with the 1, 1, 1-trichlorobenzene were each dyed at 99°–100° C. for one-half hour in a 30:1 liquor ratio dyebath containing
1.0 percent OWF CI Disperse Blue 27
0.5 percent OWF Sodium acetate After dyeing the samples were washed with water at 30° C. to remove any unfixed dyestuff. The shades of the dyeing were as follows:

| Sample | Treatment | Depth of Shade |
|---|---|---|
| 1 | Chlorobenzene vapors | Full blue |
| 2 | Blank | Light blue stain |
| 3 | Solvent extracted | Light blue stain, only slightly more level than Sample No. 2 |

Sample 1–3 were deknitted and the yarns were boiled in water for one-fourth hour. Sample 1 retained the crimp while Sample 2 and 3 did not retain the crimp.

EXAMPLE 5

A 2.0-mil film made of polyethylene terephthalate, commercially known as Mylar, was placed in a chamber saturated with vapors of chlorobenzene at 132° C. for a period of 5 seconds. The film was then immersed in three separate portions of 1, 1, 1- trichloroethane in order to remove the chlorobenzene and subsequently dried at 90° C. for 30 seconds in order to remove the residual 1, 1, 1-trichloroethane.

The treated film was dyed at 99°–100° C. for one-half hour in a 30:1 liquor ratio dyebath of the composition as described in Example 1. After dyeing the film was washed with water at 30° C. in order to remove any unfixed dyestuff. The film was dyed a full shade of blue.

EXAMPLE 6

A 2.0-mil film made of polyethylene terephthalate, commercially known as Mylar, was placed in a chamber with vapors of chlorobenzene at 148° C. for a period of 5 seconds. The sample upon removal from the chamber was free of chlorobenzene. Alternatively, samples which may contain chlorobenzene can be immersed in 1, 1, 1- trichloroethane to extract the chlorobenzene. The treated film was dyed at 99°–100bL C. for one-half hour in a 30:1 liquor ratio dyebath of the following composition:
1.0 percent OWF Disperse Yellow 54
0.5 percent OWF Sodium acetate After dyeing the fabric was washed with water at 30° C. in order to remove any unfixed dyestuff. The fabric was dyed a full shade of blue.

EXAMPLE 7

The general procedure disclosed in Example 6 was repeated with 2.0-mil polyethylene terephthalate film, commercially known as Mylar, but different halogenated aromatic hydrocarbons, temperatures and dyestuffs as noted below were employed.

| Sample | Halogenated Aromatic Hydrocarbon | Temperature | Dyestuff | Color |
|---|---|---|---|---|
| 1 | Bromobenzene | 165° C. | Disperse Blue 64 | Full blue |
| 2 | α -chlorotoluene | 184° C. | Disperse Red 60 | Full red |
| 3 | α, α, 2-trichloro toluene | 155° C. | Disperse Yellow 54 | Full Bright Yellow |
| 4 | Bromobenzene | 160° C. | Disperse Red 60 | Full red |

EXAMPLE 8

A tufted carpet sample made of polyethylene terephthalate fiber, commercially known as Encron, was placed in a chamber saturated with vapors of chlorobenzene at 132° C. for a period of 10 seconds. The sample then immersed in three separate portions of 1, 1, 1- trichloroethane in order to remove the chlorobenzene and subsequently dried at 90° C. for 30 seconds in order to remove the residual 1, 1, 1-trichloroethane.

The treated sample was dyed at 99°–100° C. for 1 hour in a 25:1 liquor ratio dyebath of the following composition:
1.0 percent OWF Disperse Red 60
0.5 percent OWF Sodium acetate After dyeing the sample was washed with water at 35° C. in order to remove any unfixed dyestuff. The carpet was dyed a full bright shade of red.

A sample of carpet as described above which had not been treated with chlorobenzene vapors was dyed at 99°–100° C. for 1 hour in a 25:1 liquor ratio dyebath of the following composition:

1.0 percent OWF Disperse Red 60
0.5 percent OWF Sodium acetate
10.0 percent OWF Emulsified biphenyl carrier After dyeing the sample was washed with water at 35° C. in order to remove any unfixed dyestuff. The carpet was dyed blue but was not as bright nor as full as the sample which had been treated with chlorobenzene vapors.

EXAMPLE 9

Yarn made of 15 denier polyethylene terephthalate fiber (Dacron brand) was passed through a chamber containing vapors of chlorobenzene maintained at 132° C. at a speed such that the yarn contacted the chlorobenzene vapors for a period of 5 seconds. The yarn was then passed through a bath of 1, 1, 1- trichloroethane at ambient temperatures. After subsequent drying, the yarn was readily dyed according to the dye formula given in Example 1 without the use of carriers in the dyebath.

We claim:

1. The method for improving the dyeability and heat setting synthetic linear polyester which comprises: contacting said polyester with a vaporized member selected from the group consisting of a halogenated aromatic hydrocarbon of the formula

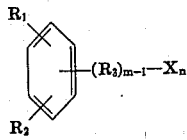

wherein $R_1$ and $R_2$ are the same or different and each stands for a member selected from the group consisting of hydrogen, alkyl having one to four carbon atoms and alkenyl having two to four carbon atoms, $R_3$ is an alkylene having one to four carbon atoms, X is a halogen selected from the group consisting of fluorine, chlorine, bromine and iodine, $n$ is a whole number from 1–3, $m$ is a whole number from 1–2 and mixtures of said halogenated aromatic hydrocarbons, removing said member from said polyester and thereafter dyeing said polyester.

2. The method according to claim 1 wherein said polyester is contacted with a vapor of said halogenated aromatic hydrocarbon which is heated to a temperature above the boiling point of the halogenated aromatic hydrocarbon but below the shrink and decomposition temperature of the polyester.

3. The method according to claim 2 wherein said halogenated aromatic hydrocarbon is represented by the formula

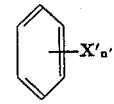

wherein X' is chlorine or bromine and $n'$ is a whole number from 1 and 2.

4. The method according to claim 3 wherein X' is chlorine.

5. The method according to claim 2 wherein said halogenated aromatic hydrocarbon is heated to a temperature relative to the temperature of said polyester such that the halogenated aromatic hydrocarbon vapors condense on said polyester.

6. The method according to claim 2 wherein said halogenated aromatic hydrocarbon is heated to a temperature relative to the temperature of said polyester such that the halogenated aromatic hydrocarbon condenses on said polyester in a thin film and continuing heating said polyester until it is above the boiling point of the halogenated aromatic hydrocarbon, thereby causing said film to volatilize off said polyester.

7. The method according to claim 1 wherein the polyester after treatment with and removal of the halogenated aromatic hydrocarbon is dyed.

8. A polyester having improved dyeability prepared by the method of claim 1.

9. The dimensional stabilized polyester prepared according to the method of claim 1.

* * * * *